United States Patent [19]

Coffer

[11] 3,986,866

[45] Oct. 19, 1976

[54] METHOD OF RECOVERY OF METAL COMPOUNDS AND METALS FROM NITRATE SOLUTIONS

[76] Inventor: Lynn Wallace Coffer, 1422 Bank St., South Pasadena, Calif. 91030

[22] Filed: Aug. 11, 1975

[21] Appl. No.: 603,540

[52] U.S. Cl. .............................. 75/101 R; 75/108; 75/117; 75/118 R; 75/120; 75/121; 423/35; 423/125; 423/143
[51] Int. Cl.² .................. C22B 23/00; C22B 15/00; C22B 47/00
[58] Field of Search .............. 75/101 R, 117, 118 R, 75/119, 108, 120, 121; 423/138, 150, 125, 143

[56] References Cited
UNITED STATES PATENTS

| | | | |
|---|---|---|---|
| 1,150,787 | 8/1915 | Rankin | 75/101 R X |
| 2,762,703 | 9/1956 | Mancke | 75/101 R |
| 2,916,357 | 12/1959 | Schaufelberger | 75/101 R X |
| 3,211,524 | 10/1965 | Hyde et al. | 75/101 R X |
| 3,240,562 | 3/1966 | Brown et al. | 75/101 R X |
| 3,720,749 | 3/1973 | Taylor et al. | 423/141 |
| 3,793,429 | 2/1974 | Queneau et al. | 423/34 |

*Primary Examiner*—G. Ozaki
*Attorney, Agent, or Firm*—Harris, Kern, Wallen & Tinsley

[57] ABSTRACT

A method is provided for recovering metal compounds and metals from ores, concentrates, alloys and other metal containing materials. The material containing said metals is leached in an aqueous solution of nitric acid at atmospheric pressure and temperatures which may vary from ambient to the atmospheric boiling point. An inorganic salt is admixed or formed in the solution to raise the atmospheric boiling point of said solution. The solution is heated to evaporate the water and to increase the concentration of the salt. The atmospheric boiling point of the solution increases with an increase in the salt concentration and causes an evolution of nitric acid or nitrogen containing gas and the sequential precipitation of metal compounds as the boiling point of the solution increases. The solution is filtered after each sequential precipitation to recover the metal compound or mixture of metal compounds which have precipitated as aforesaid. Thereafter the metal compounds may be separated and treated by conventional means to produce a relatively pure metal or an alloy.

11 Claims, No Drawings

METHOD OF RECOVERY OF METAL COMPOUNDS AND METALS FROM NITRATE SOLUTIONS

BACKGROUND OF THE INVENTION

Much of the world's metal reserves are in low grade mineral deposits which contain relatively low percentages of metals. It is not generally economically feasible to recover metals from low grade minerals because the cost of processing such materials by conventional methods often exceeds the value of the recovered metal.

Another disadvantage of conventional methods is that they are generally limited to the recovery of one metal at the expense of sacrificing or discarding the other recoverable metals.

Conventional methods are also unsatisfactory because they may require the use of high temperature and pressurized autoclaves which introduce problems of maintaining pressure seals and proper agitation. Such autoclaves are also expensive to purchase and to maintain.

SUMMARY OF THE INVENTION

A process is provided for recovering metals from ores, concentrates, alloys and other materials containing metals which overcomes the prior problems associated with the recovery of metal, and which is particularity useful and advantageous in selectively recovering metal compounds and metals from ores containing relatively low concentrations of metals. The process of this invention is based upon the discovery that metal compounds can be selectively and sequentially precipitated from solutions of nitric acid by admixing an inorganic salt in said solution to raise the boiling point of said solution at atmospheric pressure to cause an evolution of nitric acid and nitrogen containing gases. When this occurs, each metal present in the solution will selectively and sequentially precipitate at specific temperature ranges as a metal compound which is believed to be a metal oxide.

The ore, concentrate, alloy or other material containing the metals to be recovered, is leached in an aqueous solution of nitric acid at atmospheric pressure to dissolve the metals. An inorganic salt is admixed in the solution or water is evaporated from salts already present in the metal source to raise the boiling point thereof. The solution with inorganic salt is heated and the water evaporated to raise the boiling point to evolve nitric acid or other nitrogen containing gas which causes one or more metal compounds to precipitate from the solution at that particular boiling point. The precipitate is separated from the solution and thereafter, the same process is repeated, i.e. the solution is heated to its new boiling point to evolve nitric acid or a nitrogen containing gas and cause a precipitation of another metal compound. This sequential and selective process is repeated until all the desired metals present in solution are precipitated or all the solvent has been evaporated to leave a final metal nitrate compound which may be decomposed by heat at a higher temperature to recover the nitric acid or nitrogen containing gases for recycle.

The amount of concentration of the salt in the solution at each stage of the process is determined by the desired boiling point which in turn is determined by the temperature at which each metal will precipitate from the solution. The temperature ranges at which certain metal compounds have been observed to precipitate from solutions of nitrate salts are as follows:

| | |
|---|---|
| Aluminum | 153° C – 212° C |
| Cobalt | 162° C – 216° C |
| Copper | 158° C – 205° C |
| Iron | 120° C – 155° C |
| Nickel | 210° C – 220° C |
| Manganese | 190° C – 210° C |
| Zinc | 220° C – 230° C |
| Silver | 190° C – 268° C+ |
| Magnesium | 350° C – 500° C+ |

Other metals, such as lead, vanadium, uranium, thorium, and gold may also be recovered by the method of the present invention after the precipitation temperatures thereof are measured.

Many metal compounds will precipitate from nitrate solutions in temperature ranges which overlap and thus such precipitates will very often contain a mixture of metal compounds which may be separated from each other by conventional means to recover the individual compounds or metals or may be processed to produce an alloy of such metals.

DESCRIPTION OF AN EMBODIMENT OF THE INVENTION

One embodiment of the present invention is described in terms of a method for recovering nickel and other metals commonly associated with nickel such as manganese, cobalt, copper, and iron, from nickel bearing ores such as nickel sulfide deposits, oxide or laterite deposits and manganese modules from the ocean floor.

To recover any one of these metals, i.e. nickel, manganese, cobalt, copper, iron, or mixtures thereof from ores containing any one of said metals or mixtures thereof pursuant to the method of this invention, the ore is leached in a hot aqueous solution of nitric acid at atmospheric pressure with or without other nitrate salts present to dissolve said metal or metals. An inorganic salt, such as magnesium nitrate, is admixed in said solution to raise the boiling point to about 155° C which occurs at a magnesium nitrate concentration of about 235 grams per liter of solution. The solution is then heated to a temperature of about 140° C to about 155° C to evolve nitric acid or a nitrogen containing gas and cause any iron present in the ore to precipitate from the solution as a compound believed to be iron oxide. The iron compound is separated along with the insoluble mineral residue by filtration and may be treated by conventional means to recover a relatively pure iron compound therefrom.

After the iron compound and gangue are separated from the solution, the concentration of inorganic salt is again increased by evaporation of water and the solution is heated to increase its boiling temperature to about 250° C to about 260° C to evolve nitric acid vapor or a nitrogen containing gas and cause nickel, manganese, cobalt, copper or mixtures thereof, to precipitate form the solution as compounds which are believed to be nickel oxide, manganese oxide, cobalt oxide, copper oxide, or mixutres of said oxides. Because all these metals will precipitate over a range of temperatures which are relatively close, it is preferrable to precipitate the metals as a mixture rather than individually because of the overlapping of temperature precipitation ranges and because these particular metals may be separated without much difficulty to recover by conventional means the relatively pure metal or alloys thereof.

The nitrogen containing gases may be converted into nitric acid and recycled for further use in the process by convention means.

Magnesium nitrate is the preferred inorganic nitrate for use in the present invention because the wide range of temperatures over which aqueous solutions of magnesium nitrate are liquid coincides with the precipitation temperature of all of the aforesaid metals. Other salts, such as the nitrates of calcium, barium, and potassium may be used as well and also have a wide temperature range of utility much like magnesium nitrate. Other inorganic salts, which are compatible with the system described herein, are also contemplated for use with the instant invention which is not limited to the use of magnesium nitrate or other specific nitrate salts.

Mineral deposits may contain sulfides or sulfates and if they do, the presence of sulfates may reduce the extent to which metal compounds will precipitate by the method of this invention because such sulfates are generally soluble and will not volatilize at the aforesaid precipitation temperature ranges and thus tend to keep at least a portion of the metals in solution. The addition of barium nitrate or calcium nitrate to the solution should eliminate any interference with such sulfides by forming insoluble barium sulfate or calcium sulfate, respectively, which will precipitate from the solution. The elimination of such sulfides also has the advantage of eliminating the possibility of forming sulfur dioxide air pollutant from the sulfides in the ore if the temperature of the system should exceed the presently contemplated precipitation temperatures. The presence of soluble chlorides in the mineral deposits presents the same problem as with soluble sulfates and should be eliminated.

When using the method of this invention to recover metals from ores or other sources of metals, other than the metals specifically referred to herein, the specific operating conditions set forth and discussed hereinabove may not necessarily apply, and a certain amount of routine testing may have to be performed to determine the particular inorganic salt and other operating conditions which are best suited for use with the particular source of metal to be treated and the metal or mixture of metals to be recovered. The choice of inorganic salt and other operating conditions, however, may be readily determined by a man skilled in the art having the benefit of the inventive concept disclosed herein.

EXAMPLE 1

100 grams of a weathered serpentine fraction of laterite ore, which was analyzed as containing 0.71 weight percent of nickel, 0.03 weight percent of cobalt, and noted to be rich in magnesium silicate, was ground to approximately 200 Tyler mesh and mixed with 50 ml of 70% nitric acid having a specific gravity of 1.42, and 10 ml of water. The resultant mixture was heated and brought to a boil for about 15 minutes. At the end of this time, the mixture was observed to be thick and some spattering occurred. About 200 ml of water at 25° C was added to the mixture which caused it to cool to about 70° C and crystallize as a solid mass. The solid mass was heated to 109° C whereupon the crystals dissolved. Some undissolved solids were present in suspension which was filtered at 80° to 90° C to yield 193 ml of a green filtrate. The undissolved residue was washed and dried and weighed 78.2 grams and assayed at 0.16 percent nickel. The filtrate assayed at 0.743 grams of nickel. Based upon the residue, filtrate, and analysis of the starting material, about 90 weight percent of the nickel originally present in the ore was present in the filtrate.

Iron was removed from the filtrate by precipitation with ammonia. The filtrate was heated and the magnesium nitrate extracted from the ore. The filtrate evaporated until the boiling temperature rose to 200°C at which point the solution started to foam and change from a clear green to a dark brown suspension. Heating was continued until the boiling point rose to 210° C. The mix was cooled and diluted with hot water to prevent crystallization. A precipitate formed with the evolution of $HNO_3$ during the heating at about 200° C and was filtered off from the filtrate. The precipitate was dried and weighed 2.1 grams. The dried precipitate was black in color and assayed at about 30 percent nickel in addition to a considerable amount of manganese oxide.

EXAMPLE 2

200 ml of a suspension containing about 65 grams of prereduced nickeliferous high iron laterite ore and 35 ml of 70% nitric acid, where mixed to give a solution of having a pH of 1.0 after heating. The mixture was heated to about 101° C for 15 to 20 minutes to leach the ore. The gangue was filtered off and washed three times with water. The filtrate and washes had a total volume of 350 ml and were assayed to contain 0.90 grams of nickel. The gangue was dried and weighed 58.5 grams and assayed at 0.090 weight percent of nickel, or a total of 0.053 grams of nickel. On the basis of solution volume, residue weight and assays, 94.4% of the nickel was extracted by nitric acid. The solution recovered at 101° C was not a clear green but was redbrown in color, indicating considerable iron content. When ammonia was added to a portion of the solution to raise the pH to 4.0, a precipitate of ferric hydroxide was thrown down and was found by analysis to contain some nickel which would be lost by the conventional recovery method unless recylcled. A 95 ml portion of the 350 ml of filtrate was evaporated until the temperature reached 120° C by concentration of metal nitrates in a small volume. A precipitate of finely divided iron oxide formed and was filtered off. This weighed 2 g and assayed 0.26% Ni. Filtrate evaporated to dryness and heated to about 200°C where it melted. The filtrate weighed 0.8 g and assayed 26.23% Ni. Concentration of nitrates leached by nitric acid raised the boiling point of the solution to 120° C where the ferric nitrate decomposed to ferric oxide and could be filtered off. Further evaporation produced a small amount of residue containing most of the nickel.

EXAMPLE 3

1500 grams of a weathered peridotite from a Western U.S. laterite deposit, assaying at 0.51 weight percent Ni, was pulverized to about 200 mesh and mixed with 500 ml of water and 250 ml 70% nitric acid (specific gravity 1.42). The temperature rose (without external heat) from about 25°C to 70°C. The mixture was then stirred and heated with the evolution of brown fumes for a few moments. The pH of the solution increased continuously as the nitric acid reacted to dissolve the magnesium silicate contained in the ore. Nitric acid was added as needed to maintain the pH at about 1.0, and a total of 1000 ml of nitric acid was added to the ore during the course of this example. Over a period of 1½ hours, the boiling temperature of the mixture rose to 147° C as a result of increase in concentration of $Mg(NO_3)_2$ from reaction with magnesium silicate and evaporation of water. The mixture was cooled to 110° C, diluted with about 300 ml of boiling water and filtered. The clear green filtrate had a volume of 850 ml. During filtration, the nitric acid continued to react so that the pH of the last filtrate was about 3.0. The residue was washed with dilute nitric acid at room temperature to give 300 ml of green wash solution having a pH of 1.0, and then with dilute nitric acid at 90°C to give 450 ml of a yellow-green wash having a pH of 1.5. The dried residue weighed 1190 grams, indicating that 310 grams or almost 21% of the ore had gone into solution. The filtrate and washes were combined to give a total of 2185 ml of clear green solution with a yellow tint. The first filtrate had contained 1.86 g Ni per liter. The combined solution contained 2.55 g Ni per liter or a total of 5.57 grams of nickel from 1500 grams of ore, amounting to approximately 73% of that contained in the original weathered peridotite at 0.51% Ni. The residue containted 0.16% Ni or a total of 1.93 grams of nickel amounting to about 20% of that contained in the original sample.

The combined solution was heated to boiling and concentrated by evaporation. A red-brown precipitate came down in the the 110° C to 120° C temperature range and was filtered, washed and dried. It weighed 3.93 g and proved to be a hydrous iron oxide, indicating that the wash of the ore residue with dilute nitric acid had redissolved some of the iron previously precipitated. The clear green solution, remaining after removal of iron, was evaporated until the boiling temperature rose to 150°C when it started to darken. Evaporation was contained until a boiling point of 220°C was reached and the mixture consisted of a brown-black solid suspended in liquid. This suspension was cooled and diluted until it boiled at 130° C. About 500 ml of this suspension was filtered while hot and using a heat lamp to keep the solution from becoming solid. The balance of the suspension was cooled, diluted with water and filtered at room temperature. The solution from the hot suspension crystallized to a solid mass. It was dissolved and diluted with water to a volume of 745 ml. 500 ml of the dilute solution weighed 663 g to give a density of 1.326 grams per ml. This appears to be about the highest density of magnesium nitrate that does not crystallize on cooling to room temperature. Assuming that the original volume of 500 ml which was liquid at 130° C represents $Mg(NO_3)_2 \cdot 6H_2O$ so that the additional 245 ml or approximately one-third the volume of water is free at room temperature, the density of $Mg(NO_3)_2 \cdot 6H_2O$ can be calculated to be about 1.5 g per ml. This agrees with the handbook value of 1.464 for $Mg(NO_3)_2 \cdot 6H_2O$. On this basis, the 500 ml of filtrate (approximately half of the total from 1500 g of ore) may have contained about 118 g of MgO, so that slightly over 16% of the ore was recovered as MgO out of a possible 38% to 40% of MgO theoretically contained in unweathered serpentine. The metal oxide mixture, precipitated by decomposition of metal nitrates from the magnesium nitrate solution, contained 24% Ni. The solution remaining from hot filtration contained 0.66 g Ni per liter while that cooled and diluted for filtration at room temperature contained 0.375 g Ni per liter. At least part of the difference was caused by dilution of the solution so no conclusions are drawn regarding the relative merits of hot versus room temperature filtration other than the obvious conservation of energy by filtering hot rather than cooling and reheating.

EXAMPLE 4

A composite made from five samples of altered peridotite or saprolite and pulverized to about 20 Tyler mesh had a calculated nickel content of 0.37%. 4733 grams of the mixture was ground in a ball mill at about 65% solids.

1000 ml of the slurry was screened wet on a 100 mesh screen to recover 230 grams of +100 mesh material. This was mixed with 100 ml water and heated to boiling, adding 70% nitric acid sufficient to keep the pH about 1.0. As the boiling point increased, more $HNO_3$ was added. When the boiling point has reached 135° C, 230 ml of 70% $HNO_3$ had been added to the solution. The total mixture had a volume of about 325 ml after it was cooled to 100° C. 200 ml of boiling water was added while stirring and the mixture filtered. The filtrate had a volume of 600 ml and the residue wieghed 173 g. The residue assayed 0.057% Ni and the filtrate contained 0.507 g Ni. On the basis of the calculated assay of the composite sample used, the 230 g of 100 mesh material should have contained 0.85 g Ni, so the extraction, based on solution was approximately 60% while that based on the residue analysis was about 88%. The weight loss of 24% indicates that as much as 50 g of MgO may have been dissolved by the reaction:

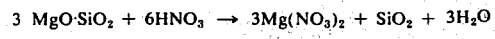

$$3\ MgO \cdot SiO_2 + 6HNO_3 \rightarrow 3Mg(NO_3)_2 + SiO_2 + 3H_2O$$

This would have required 121 grams of 100% $HNO_3$ or 121 ml of concentrated $HNO_3$. Since 230 ml of 70% $HNO_3$ was actually required and the volume of solution decreased by about 100 ml during boiling, these figures appear consistent.

EXAMPLE 5

Three thousand seven hundred and twenty two grams (3722 g) of mixed material from the silicate zone of nickeliferous laterite, (having a calculated nickel content of 0.37%) was crushed and ground in a ball mill to 22% + 100 Tyler mesh after adding water to give a pulp density of approximately 75% solids. The slurry was transferred to a stainless steel pot, leaving one hundred percent unoccupied volume. 1500 ml of 70% nitric acid was added as the mixture was stirred with a stainless steel rod. The temperature rose to 106° C with evolution of a nitrogen containing gas. The boiling mixture foamed almost to the top of the container. After the vigorous reaction had subsided, more nitric acid was added until a total of 2500 ml of nitric acid had been used. The mixture was then heated to 130° C and held at this temperature for about half an hour. It was cooled to 110° C and boiling water was added with stirring to keep the nitrates in solution. The mixture was filtered leaving the iron oxide with the residue to produce 6135 ml of clear green solution (found by analysis to contain 8.99 g of nickel). After washing and drying, the residue weighed 3075 g and contained 2.77 g of Ni. The total nickel accounted for was 11.76 g of which slightly over 76% was in solution. The residue contained 0.09% nickel.

Five liters of the filtrate was heated to boiling in a stainless steel kettle. It started boiling at about 100° C and was heated to evaporate water and raise the boiling point of the solution. It remained a clear green color until a temperature of 160°C was reached. At this point, it started to become slightly cloudy and had turned to a dark brown syrupy slurry at 185° C. A rapid evolution of small bubbles at 190° C was noted and continued at a diminished rate until a temperature of 257° C had been reached. The hot solution was cooled slowly to 200° C and hot water was added carefully, while stirring to facilitate mixing. After dilution, the slurry was filtered at about 80° to 90° C and the residue washed thoroughly with water. A black precipitate recovered was found to weigh 26 g after washing and drying. This precipitate was analyzed as a mixture of metal oxides which assayed at 25.0% nickel, 0.6% cobalt, and 5.65% manganese. Five grams of the black mixed oxide was treated with nitric acid to dissolve the nickel and cobalt, leaving 0.620 g (12.4% of black precipitate) of insoluble $MnO_2$. The nickel nitrate-cobalt nitrate solution was electrolysed to produce a nickel-cobalt alloy on the cathode. The filtrate was found to contain 0.53 g per liter of nickel. The filtrate was made slightly ammoniacal by the addition of ammonia and treated with gaseous hydrogen sulfide to recover a black precipitate of mixed cobalt and nickel sulfides, leaving only 0.001 g of nickel per liter of solution. The solution was evaporated to give a thick syrup at a boiling point of about 300° C. This was heated to about 750° C to decompose the magnesium nitrate to magnesium oxide and nitrogen oxides which could be converted to nitric acid for recycle.

EXAMPLE 6

20 grams of manganese nodule material (recovered from the ocean floor) containing manganese, nickel, cobalt, copper, iron and traces of chromium was ground to minus Tyler 100 mesh for treatment. Rather than the normal gaseous reduction, the material was slurried in water and reduced by the addition of 3.5 ml of 64% hydrazine solution. The mixture heated spontaneously with effervescence during reduction. When the reaction seemed complete, the equivalent of 20 ml of concentrated $HNO_3$(20 g. of 100% $HNO_3$) was added cautiously to give a pH of about 1.0. The total volume of the suspension was about 50 ml. It was heated and boiled at about 110° C. 50 ml of Mg $(NO_3)_2$ solution having a specific gravity of 1.292 was added and the mixture heated to boiling which started at 108° C. The pH was adjusted to 1.0 by the addition of 7 ml concentrated $HNO_3$ with considerable effervescence. Evaporation was continued till the atmospheric boiling temperature reached 120° C when the mixture started foaming, indicating decomposition, which continued till a temperature of 130° C was reached. The mixture was cooled, diluted, and filtered to give 11.6 g. residue after drying. The residue analysed at about 17% Mn. 0.116% Ni, 0.056% Co, 0.068% Cu, 12.2% Fe, and 0.038% Cr. The filtrate was green in color and was heated to 160° – 210°C during which time a precipitate was formed. The mixture was cooled, diluted with water, filtered and washed. The dry precipitate weighed 5.8 g. and analysed about 2.25% Ni, 0.140% Co, 49% Mn, 2.17% Cu, and 0.004% Fe, and 0.002% Cr. The filtrate was heated to evaporate water and to raise the boiling point. At 220°C, nitrogen containing fumes were given off in puffs from a black viscous suspension. Evaporation was continued until the boiling point reached 250° C. The mixture was cooled, diluted with boiling water, filtered and dried. The black dried precipitate weighed 2.65 g. and analyzed at 5.0% Ni, 0.86% Co, 50% Mn, 1.36% Cu, and 0.01% Fe. The Ni, Co, Cu and Mn could be separated from the manganese dioxide by dissolution in $HNO_3$ to leave a relatively pure $MnO_2$ with the soluble elements separable chemically, or by solvent ion exchange, and the individual metals recovered in a relatively pure state by electrolysis.

EXAMPLE 7

100 grams of weathered nickel sulfide ore containing approximately 1.75% Ni as a mixed oxide and sulfide, was ground to minus 100 Tyler mesh and mixed with 100 ml of water. 70% $HNO_3$ was added slowly to the ore and the evolution of brown nitrogen containing fumes was noted. The pH of the slurry was maintained at about 1.0 by the addition of more $HNO_3$. The slurry was boiled for about an hour at 102°C. A total of 25 ml of 70% $HNO_3$ was required to keep the pH below 1.0. The slurry was diluted to a volume of 200 ml by the addition of water and heated again to 101° C. The mixture was filtered, and the dried residue weighed 91.7 g. The filtrate was dark blue-green and clear. The residue was washed with hot water and combined with the filtrate and washings. A portion of the filtrate was tested for sulfate by the addition of calcium nitrate and heated to boiling. Precipitation of white needle crystals of gypsum confirmed the presence of sulfate. The filtrate was heated to boiling and the equivalent of 5.0 g. CaO as calcium nitrate was added to precipitate calcium sulfate on boiling. The dried white needle crystals weighed 1.249 g. indicating that an excess of calcium nitrate had been used. The green filtrate had a volume of 300 ml and boiled at 103° C. 100 ml of saturated magnesium nitrate solution, having a specific gravity of 1.376 at 80° C and showing some crystallization of $Mg(NO_3)_2.8H_2O$ at room temperature, was added. The mixture started boiling at 103°C on heating. When the original 400 ml had evaporated to a volume of about 105 ml, it boiled at 127° C. At this point, the solution darkened and started to evolve small bubbles of $HNO_3$ to produce a foam which continued till a temperature of 160°C was reached. A suspension had formed to give a khaki appearance. At 170° C, foaming had stopped and normal boiling continued. The volume was about 70 ml. The mixture was cooled to 140° C and cautiously diluted by pouring boiling water down the sides of the beaker while stirring. On dilution to 150 ml. the mixture was a suspension of a buff-colored precipitate in a green solution. This was filtered at about 80° C and the precipitate washed with water. The dried precipitate weighed 5.3 g. A sample dissolved in $HNO_3$ to give a small colorless residue and a light yellow solution, the soluble material assaying 0.04% Ni, 16.25% Fe and 23.3% Cr. The filtrate had a volume of 333 ml, was clear green in color and contained about 4 grams of nickel, 4.5 grams manganese per liter and no iron as shown by atomic absorption. The filtrate evaporated till the atmospheric boiling point reached 130° C when the dark green liquid started foaming and continued to foam with only slight darkening of the green color until the volume had decreased to about 50 ml. and the atmospheric boiling point was 190° C. At this point, the solution became cloudy, a green precipitate initially appearing and increasing as the temperature rose.

Heating was continued till the atmospheric boiling point reached 255° C. Cooled, diluted with boiling water and filtered to recover a blue-green precipitate from a light green filtrate. The precipitate contained 11.50% Ni, 0.005% Mn and 0.02% Fe. The filtrate was evaporated to a boiling temperature of 274° C when a dark gray precipitate was formed. This was found to contain 24.8% Ni, 0.30% Mn and 0.04% Fe. on the basis of the 1.75% Ni contained in the ore and 0.36% Ni in 91.7 g. of residue material, the extraction of nickel was 81% complete without reduction.

EXAMPLE 8

100 grams of reagent grade aluminum nitrate nonahydrate $Al(NO_3)_3 \cdot 9H_2O$ were dissolved in 100 ml of a magnesium nitrate solution having a specific gravity of 1.292 (approximately 50% by weight $Mg(NO_3)_2 \cdot 6H_2O$). The clear solution was heated and started boiling at 120°C. The heating was continued with the evaporation of water. The solution remained clear and colorless with normal boiling with normal boiling until a temperature of 150° C was reached. At 153° C there was some foaming and a skin effect on the surface. Foaming increased and colorless crystals formed on surface at 157° C. At 163° C white crystals were forming in solution. At 168° C the crystals occupied most of the volume with the magnesium nitrate hexahydrate as an interstitial liquid. Some $NO_2$ fumes were coming off whereas at lower temperature, nitric acid fumes were being released. Allowed temperature to rise to 240° C. The white mass was cooled to 140° C mixed with 100 ml of boiling water and allowed to cool. It was filtered and washed to get a white crystalline residue and dried at 105° C. The product varied from relatively coarse crystals to almost an amorphous residue of an aluminum compound. The dry weight was 17.5 grams. 100 grams of $Al(NO_3)_2 \cdot 9H_2O$ decomposed to $Al_2O_3$ should weigh 13.59 grams so the product contained a small amount of $Mg(NO_3)_2 \cdot 6H_2O$, some undecomposed aluminum compounds, or it was slightly hydrated.

EXAMPLE 9

100 grams of kaolin (clay) were suspended in 300 ml of $Mg(NO_3)_2$ solution having a specific gravity of 1.292 and 50 ml of concentrated $HNO_3$ was added. The mixture was heated to boiling at 110° C and continued to evaporate solution until boiling point reached 150° C. Cooled to about 130° C and added 100 ml of boiling water. Started filtering at 100° C to get clear faint yellow tinted filtrate. Dried residue weighed 96 grams. Filtrate evaporated till boiling point reached 220° C. Cooled to 140° C, added 100 ml of boiling water and filtered at about 100° C to produce a light buff colored white residue which weighed 3.0 grams.

50 grams of the dried residue from the above kaolin was mixed with 2 grams of powdered fluorspar, 205 ml of $Mg(NO_3)_2$ solution and 45 ml of concentrated nitric acid. The mixture was heated for 2½ hours at 115° C in a stainless steel vessel then transferred to a glass beaker and heated strongly till the boiling temperature 145° C. Considerable reaction, with foaming, occurred in the 127° to 134°C range. Cooled to 130° C and diluted with 100 ml of boiling water. Filtered to get deep yellow filtrate. Dried residue weighed 45.5 grams. The filtrate was evaporated till the boiling point reached 210°C. A white precipitate of $Al_2O_3$ came down and was cooled to 140°C then diluted with 200 ml of boiling water. Filtered and dried precipitate which weighed 6.5 grams after drying and was white in color.

EXAMPLE 10

Five grams of copper carbonate were dissolved in mixture of 30 ml $H_2O$ and 10 ml of nitric acid. The solution was boiled to drive off residual $CO_2$ and 40 ml of saturated $Mg(NO_3)_2$ solution was added. The mixture was evaporated to a total volume of about 70 ml, which boiled at 115° C. It was clear, deep blue in color. Heating was continued until the boiling point reached 158°C when the blue solution started to become opaque and foamed with colorless vapor of nitric acid coming off. In the 178° to 180° C range a dark green blue precipitate formed. The reaction seemed complete at 100° C. The temperature was allowed to rise to 200° C and then cooled to about 140° C and diluted with 45 ml of boiling water. A suspension of blue particles of a copper compound was filtered off and dried. The filtrate was blue indicating that precipitation was incomplete, and some copper remained in solution.

EXAMPLE 11

One gram of iron metal powder was dissolved in nitric acid and water to make 20 ml of ferric nitrate solution. 40 ml of a saturated solution of $Mg(NO_3)_2$ were added thereto. The mixture was heated to evaporate water and raise the atmospheric boiling point. At 135° C the clear yellow solution became cloudy with the evolution of a colorless gas. The precipitation increased with further evolution of gas till the temperature reached 150° to 155°C at which point, normal boiling resumed. The solution was cooled, diluted and filtered. The precipitate was an orange-red iron compound and so finely divided that it was difficult to retain on the filter paper. The air-dried precipitate weighed 1.5006 grams.

EXAMPLE 12

4.953 grams of pure $Ni(NO_3)_2 \cdot 6H_2O$ (containing 1 gram Ni) was dissolved in a total volume of 75 ml magnesium nitrate solution, then heated to boiling. The solution remained clear green until a boiling point of 155° C was reached when some nitric acid was evolved and the solution became darker and started to form light green precipitate at 215° C. The solution was heated to 230°C to give 1.4491 grams of light green colored nickel compound precipitate after cooling, dilution, filtering and drying.

EXAMPLE 13

4.938 grams of reagent grade cobalt nitrate hexahydrate containing 1.00 grams of cobalt was dissolved in 75 ml of magnesium nitrate, having a specific gravity of 1.292 (approximately 50% by weight of $Mg(NO_3)_2 \cdot 6H_2O$). The clear pink solution boiled at 140° C only deepening to a purple in color. There was no further change until a temperature of 210° C was reached. Above this point an acid gas evolved and a black precipitate of a cobalt compound was formed. This was cooled, diluted, filtered and dried to recover 1.584 grams of black powder.

EXAMPLE 14

22 grams of high grade chalcocite (principally $Cu_2S$), was ground to pass 100 mesh Tyler screen, and mixed with 50 ml of water. The addition of 50 ml of concentrated nitric acid caused most of the black material to go into solution with the evolution of some brown fumes of $NO_2$. The pH was 0.0 as indicated by pH paper. After heating to gentle boiling for an hour a granular porous residue was filtered off. This was treated with 10 ml of concentrated nitric acid in 50 ml of water and boiled down to about 10 ml volume when the residue collected into globules of molten sulfur. The solution was cooled and the sulfur globules filtered off. Filtrate was combined with the first filtrate and 50 ml of calcium nitrate solution containing 5 grams of CaO and 10 grams of nitric acid was added to precipitate sulfate formed during oxidation of the copper sulfide by nitric acid. The solution was heated to boiling and a white precipitate of $CaSO_4$ filtered off. 50 ml of $Mg(NO_3)_2$ solution having a specific gravity of 1.296 was added and the solution heated to boiling and evaporated. A red-brown precipitate started to form at 185° C and had become quite voluminous at 205° C. The mixture was cooled to about 140° C, diluted with boiling water to a volume of about 150 ml and filtered at 80° to 100° C. The red-brown precipitate dried to a soft powdery cake and weighed 9.33 grams. 1 gram of this material treated with concentrated ammonium hydroxide to dissolve copper oxide which went into solution only slowly to give a deep blue solution. Ammonia was evaporated and the residue dissolved in 5 ml of nitric acid to give a clear green solution. On adding ammonia to this, a deep blue solution of copper amine was formed and a red-brown residue of ferric hydroxide was filtered off. This was found to weigh 0.1020 grams, indicating that the original 9.23 gram precipitate was only 89.80% copper oxide, the balance being ferric oxide which had accounted for the red-brown color. The blue filtrate from the first decomposition was suspected to contain extra sulfate. 10 ml of $Ca(NO_3)_2$ containing 1 g of CaO dissolved in nitric acid was added and the solution heated to about 110° C to get precipitate of white needles, characteristic of $CaSO_4$. Filtered off. The filtrate was heated to 210° C when a green precipitate started forming. Continued heating to 230° C, cooled, diluted with boiling water and filtered at 80° to 100° C. Light green crystalline precipitate was soft cake on drying, weighing 12.38 g. 1 gram of this material leached with concentrated ammonia gave a light blue gray residue weighing 0.2970 grams indicating that only 70.30% of the precipitate was free copper oxide, the balance possibly being a magnesium or calcium sulfate complex of unknown composition. The filtrate from this product was tested for sulfate by the addition of more calcium nitrate with negative results. Silver nitrate added as a test for chloride showed only a white cloudiness but no precipitate of AgCl. Reheating the filtrate to 230° C produced 5.20 grams more light blue green precipitate of a copper compound. 22 grams $Cu_2S$, if chalcocite were pure would be equal to 27.5 grams of CuO. Material recovered, assuming ammonia soluble copper to be CuO amounted to 21.12 grams.

EXAMPLE 15

A pyritic gold concentrate containing about 6 oz. of gold and 16 oz. of silver per ton, with about 4% lead, 2% zinc and 4% copper was roasted at 1500° to 1800° F to eliminate some of the sulfur. The calcine was leached with nitric acid to clean up the gold surfaces prior to cyanidation. 100 grams of calcine was heated to boiling in a solution of 50 ml $H_2O$ 37 ml of 70% $HNO_3$ (sp. g. = 1.42) to produce a blue-green leach solution containing iron. The residue was filtered, washed and the gold extracted with sodium cyanide. The filtrate containing the nitrate solution of the soluble metals was heated to recover the metal oxides and distill off nitric acid used in leaching. The filtrate and wash solution had a volume of 750 ml. 300 ml of magnesium nitrate, having a specific gravity of 1.2, was added and the solution heated to boil and evaporate water. When the volume was reduced to 300 ml the boiling point was 108° C. A brown precipitate started forming and increased as the temperature was increased by further evaportion to 133° C. Mixture was cooled, diluted with about 200 ml of boiling water and filtered. A brown precipitate was collected, some of which went through the filter and was reflected after standing. The filtrate was blue in color and had a volume of 300 ml. It was heated to boiling at 110°C. The addition of $Ca(NO_3)_2$ did not produce a precipitate, indicating little or no sulfate present. The clear blue solution boiled normally to 135° C when considerable foaming started. Solution started to become cloudy at 145° C and a precipitate started forming at 160° C. At 170° C there was obviously some material in suspension. Cooled mixture, diluted and filtered to get a brown precipitate, that weighed 0.16 g on drying, from a clear blue filtrate. The precipitate was obviously hydrous iron oxide which had been dissolved but had not decomposed until the 145° C temperature was reached. Reheated filtrate with considerable foaming occurring. Solution remained clear dark blue until the temperature reached 183° C when a light blue precipitate started to form. Precipitate increased in volume till the temperature reached 200° C when it started to darken, indicating a different material being precipitated. Continued heating until the temperature reached 260° C. At this point, the precipitate was in two parts, — a heavy gray material at the bottom of the beaker and a greenish flocculent material dispersed through the liquid at 80° to 100° C. Residue seemed to be made up of mixture of green and gray materials. Total weight of dry material was 4.50 grams. One gram of the dry material was leached with concentrated ammonia to dissolve about half of it to give a deep blue copper amine. The gray residue from one gram weighed 0.4180 grams indicating that 58.20% of the precipitate was copper oxide. The gray material was probably lead oxide discolored by black metallic silver precipitate.

EXAMPLE 16

25.4 grams of silver nitrate, $AgNO_3$, dissolved in 100 ml of $Mg(NO_3)_2$ solution, having a specific gravity of 1.288 at 27° C. Heated to put $AgNO_3$ into solution. Mixture started boiling at 110° C at a volume of about 120 ml. Continued boiling to 185° C when faint odor of nitric acid was noted. At this point, the volume of the solution had been reduced by evaporation of solvent water to about 50 ml. When the boiling point had reached 210° C enough $HNO_3$ fumes were coming off to give moist pH paper the color corresponding to pH 1.0. Small bubbles produced a white foam on top of the solution. Volume about 40 ml. Continued boiling with foaming and formation of what appeared to be a white precipitate in solution till a temperature of 268° C was reached. At this point the volume was about 28 ml. Nitric acid fumes were still being evolved at what seemed to be a slower rate. Stopped heating, cooled to about 180° C and added boiling water cautiously down the sides of the beaker to dilute the mixture. Solution had a volume of about 100 ml when the white suspended material gave way to a black precipitate that suddenly appeared on further dilution. Diluted to 150 ml. Filtered, washed black precipitate and dried. Brownish, black powder weighed 2.050 grams. Apparently all the silver nitrate had not been decomposed even at 268° C. Confirmed by adding KCL to a few drops of filtrate to get curdy white precipitate. characteristic of AgCl.

EXAMPLE 17

About 200 ml of magnesium nitrate solution from which iron, nickel, cobalt, and manganese had been precipitated at temperatures up to 225° C was evaporated to dryness in an evaporating dish. The residue was ignited in a furnace at 400° with the evolution of copious brown fumes of nitrogen dioxide. The calcined material was a friable porous white residue. A sample sent to a reliable spectrography laboratory showed the following semi-quantitative spectrographic analysis:

Mg — major constituent, Si 0.012%; Al — 0.0021% Ca 0.035%, Ni — 0.0024%, Cu — 0.0014%, Fe — 0.0027%, Pb — 0.020%.

I claim:

1. A process for recovering metal compounds from material containing said metals, said process, comprising:
    a. leaching said material in a aqueous solution of nitric acid at atmospheric pressure to dissolve said metals,
    b. adding an inorganic salt to said solution,
    c. heating said solution to increase the concentration of said salt therein by evaporating the water therefrom and thereby sequentially increasing the atmospheric boiling point of said solution until a nitrogen containing gas evolves from said solution and allows said metal compounds to selectively and sequentially precipitate from said solution during each sequential rise in temperature of said solution and,
    d. filtering said solution after each sequential rise in temperature to recover the metal compound or mixture of metal compounds precipitated after each sequential rise in temperature.

2. A process as set forth in claim 1 wherein said inorganic salt is a nitrate or mixture of nitrates.

3. A process as set forth in claim 2 wherein said metal containing material is ore and said metal is any one of the group comprising nickel, manganese, cobalt, copper, iron or mixtures thereof.

4. A process as set forth in claim 2 wherein said metal containing material is ore and said metal is any one of the group comprising lead, silver, copper, gold, or mixtures thereof.

5. A process as set forth in claim 2 wherein said metal containing material is ore and said metal is aluminum.

6. A process as set forth in claim 1 wherein said inorganic salt is magnesium nitrate.

7. A process as set forth in claim 1 wherein said inorganic salt is barium nitrate or calcium nitrate.

8. A process for recovering metal compounds comprising nickel, manganese, cobalt, copper, iron, or mixtures thereof, from ores containing any one or more of said metals, said process comprising:
    a. leaching said ore in a hot aqueous solution of nitric acid at atmospheric pressure to dissolve said metals,
    b. adding an inorganic salt to said solution to raise the boiling point thereof to about 155° C,
    c. heating said solution to between about 140° C and about 155° C to evolve a nitrogen containing gas and to cause any iron present in said ore to precipitate from said solution as an iron compound,
    d. separating and recovering any said iron compound from said solution,
    e. heating said solution to evaporate water therefrom and increase the salt concentration thereof to raise the boiling point of said solution to about 260° C.
    f. heating said solution to the range of about 250° C to 260° C to evolve a nitrogen containing gas and cause any nickel, manganese, cobalt or copper present in said ore to precipitate from said solution as a compound of manganese, cobalt, copper, or mixtures thereof,
    g. separating and recovering said compound or mixtures thereof from said solution.

9. A process as set forth in claim 8 wherein said inorganic salt is a nitrate or a mixture of nitrates.

10. A process as set forth in claim 8 wherein said inorganic salt is magnesium nitrate.

11. A process as set forth in claim 10 wherein said inorganic salt is a mixture of magnesium nitrate and barium nitrate or calcium nitrate.

* * * * *

UNITED STATES PATENT AND TRADEMARK OFFICE
CERTIFICATE OF CORRECTION

PATENT NO. : 3,986,866
DATED : October 19, 1976
INVENTOR(S) : Lynn Wallace Coffer It is certified that error appears in the above-identified patent and that said Letters Patent are hereby corrected as shown below:

Column 9, line 21, delete one occurrance of "with normal boiling"

Column 9, lines 60-61, "till the boiling temperature 145° C" should read --temperature reached 145°C--

Column 10, line 16, "seemed complete at 100°C" should read --seemed complete at 199°C--

Column 12, line 15, "and was reflected after standing" should read --and was refiltered after standing--

Signed and Sealed this

Twenty-sixth Day of April 1977

[SEAL]

Attest:

RUTH C. MASON
Attesting Officer

C. MARSHALL DANN
Commissioner of Patents and Trademarks